Dec. 1, 1970 E. MOHRBACH 3,543,317

COMBINED FORMING PRESS AND EJECTING DEVICE

Filed June 2, 1969 6 Sheets-Sheet 1

INVENTOR.
Ernst MOHRBACH

BY KARL RATH
ATTORNEY

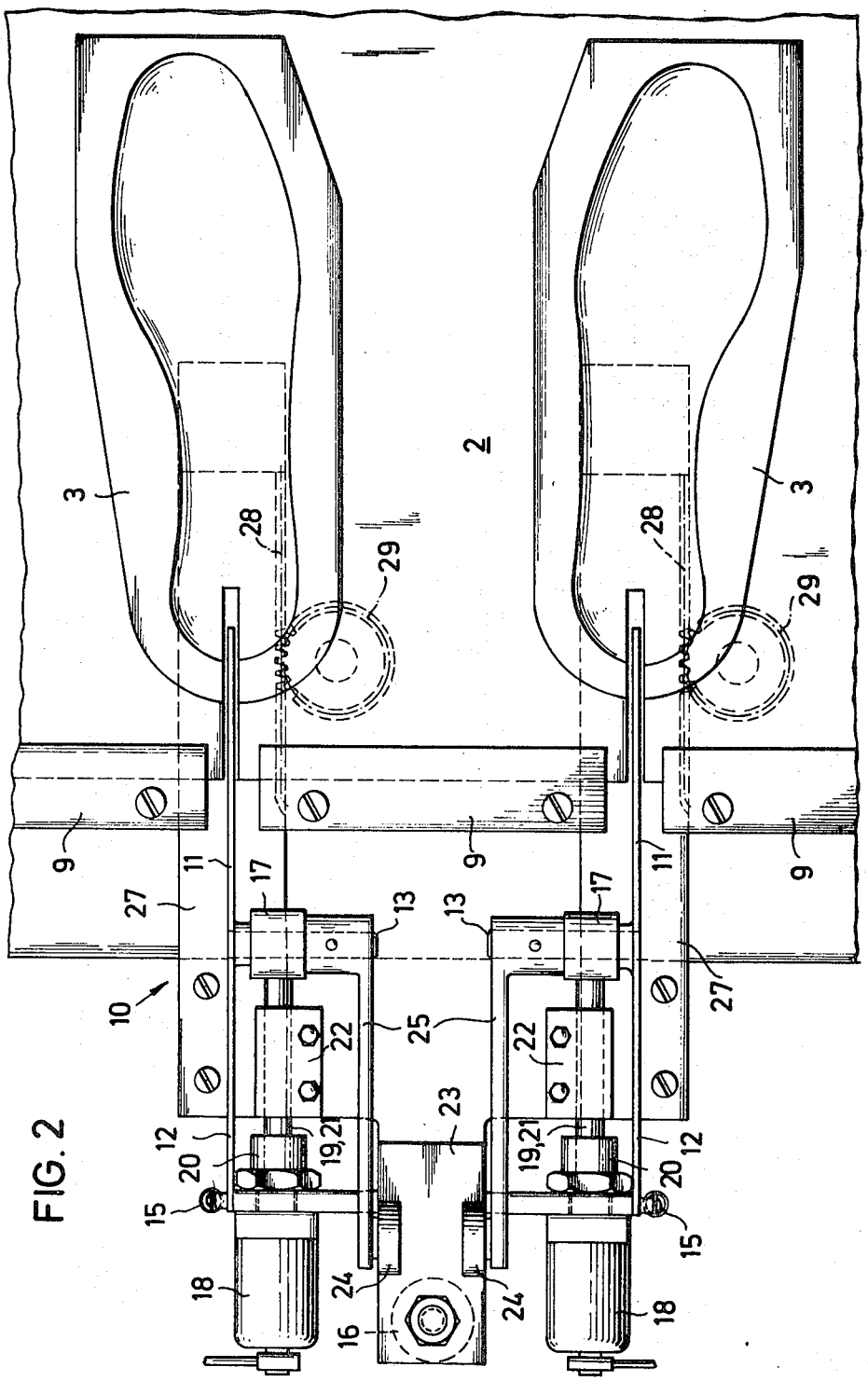

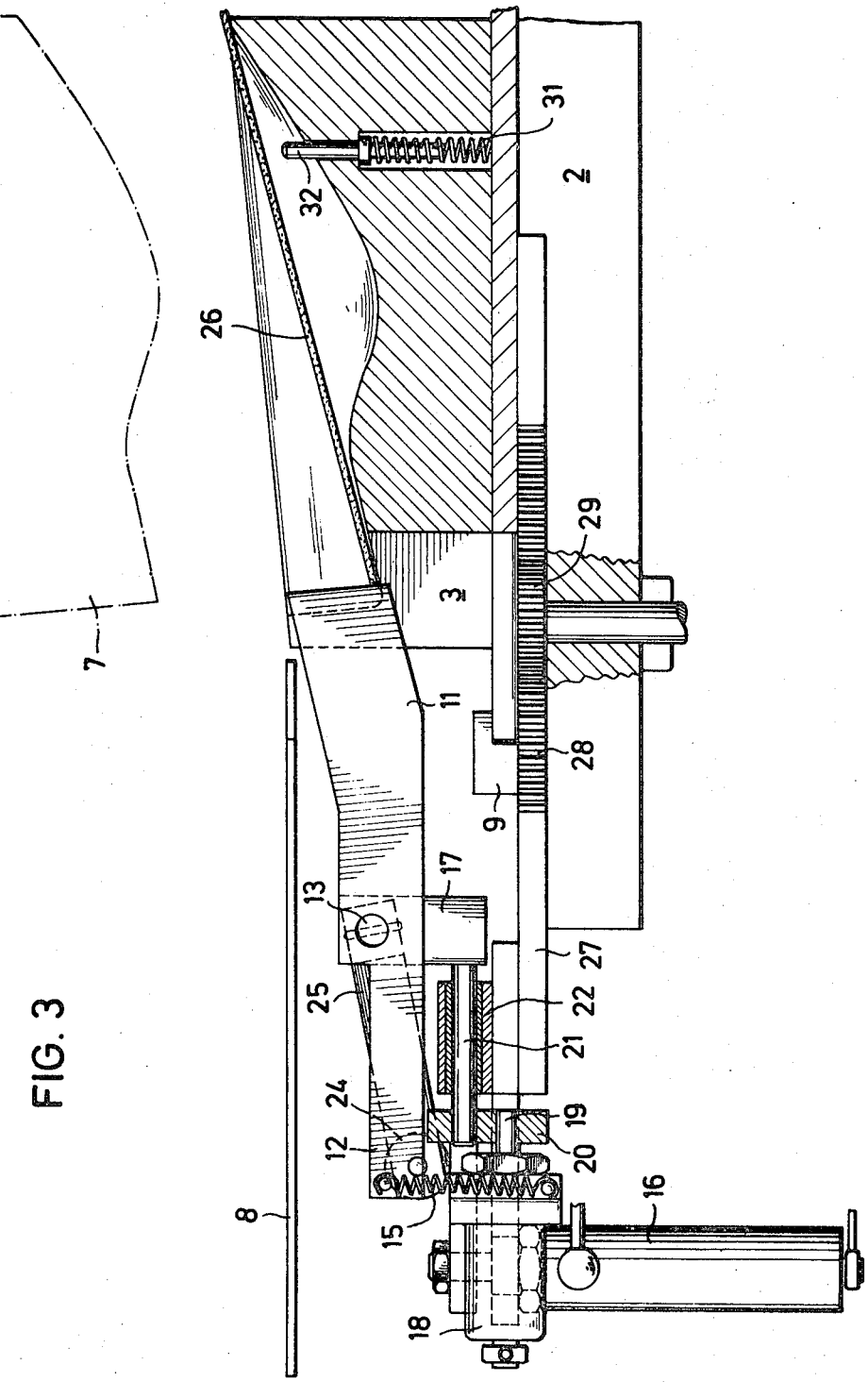

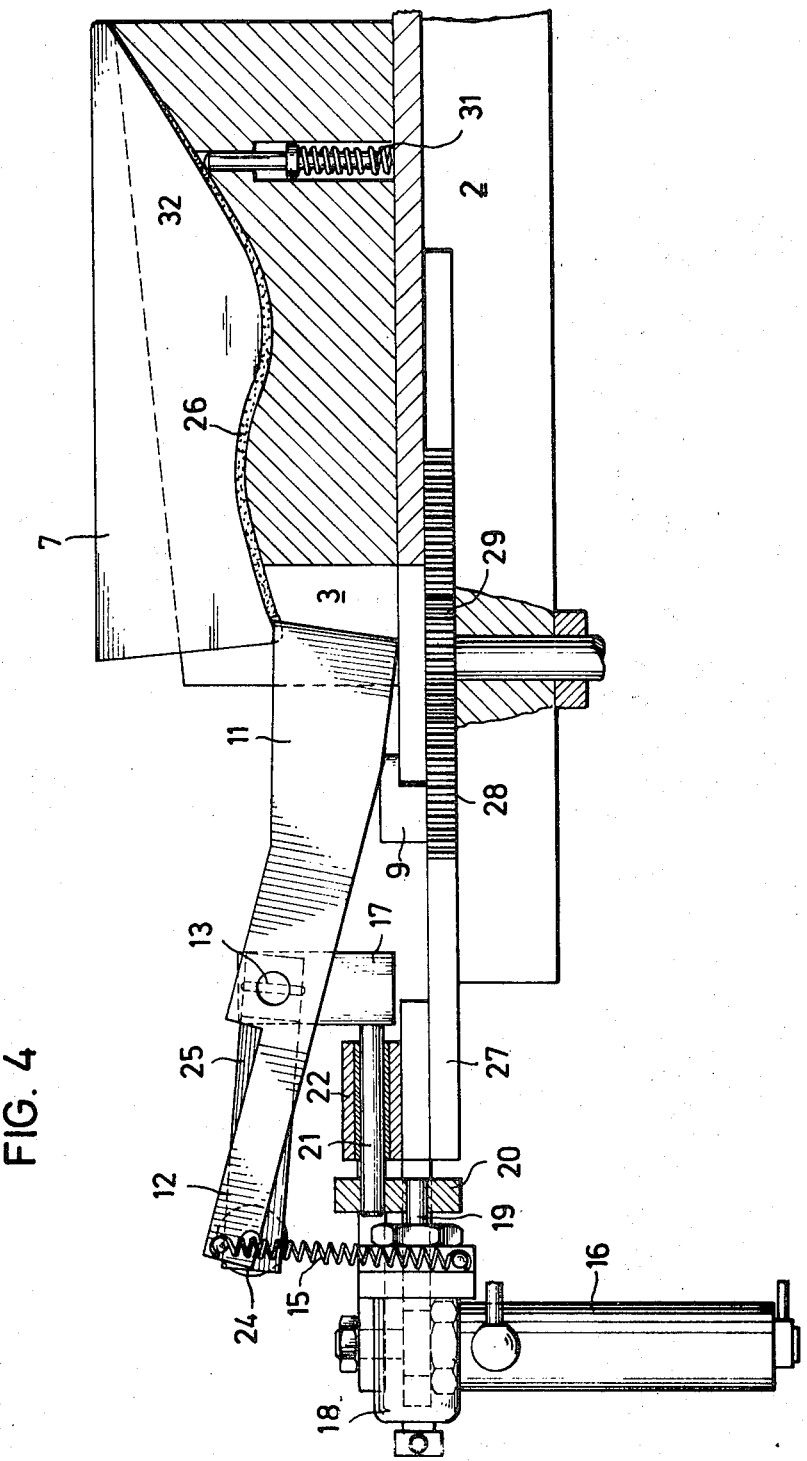

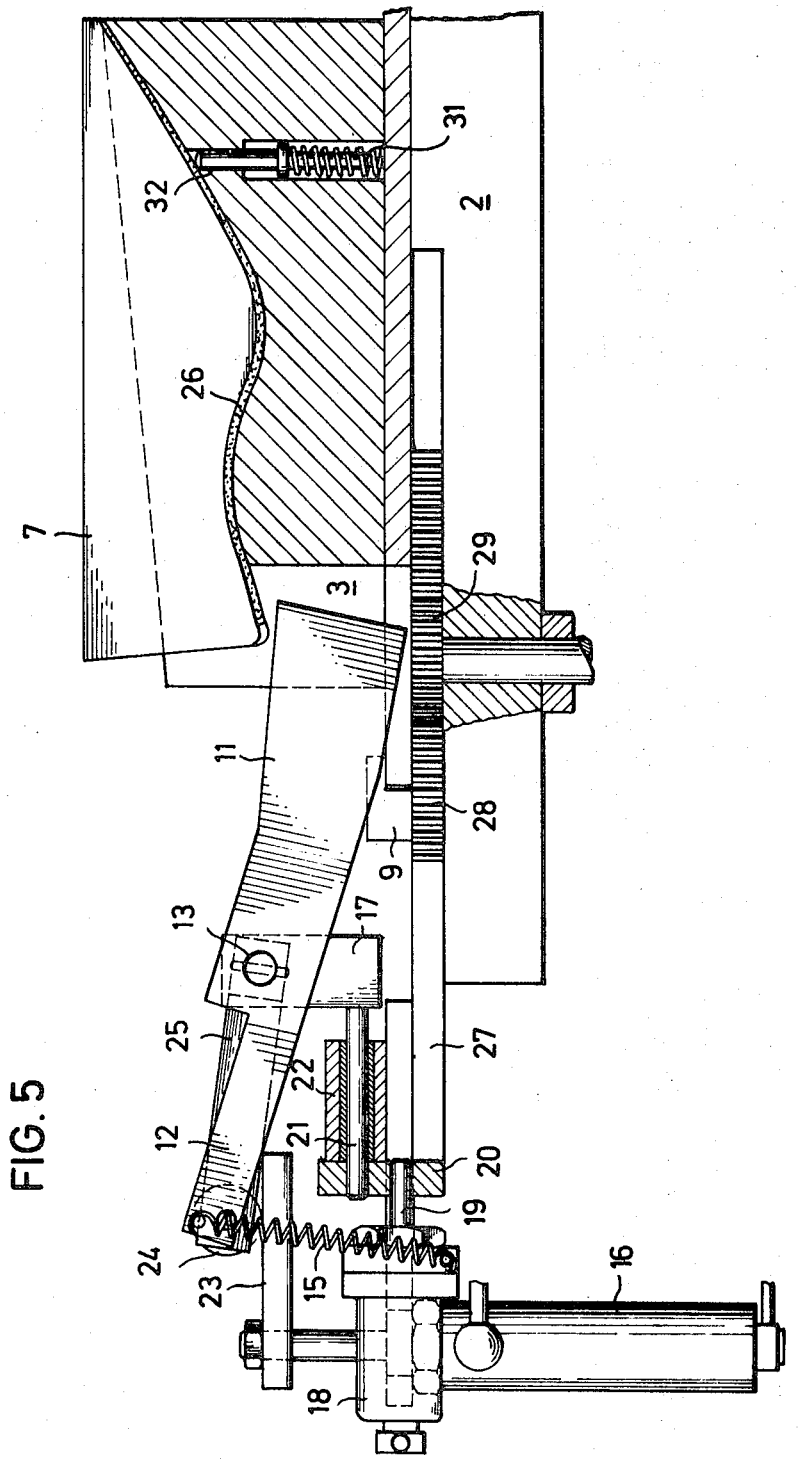

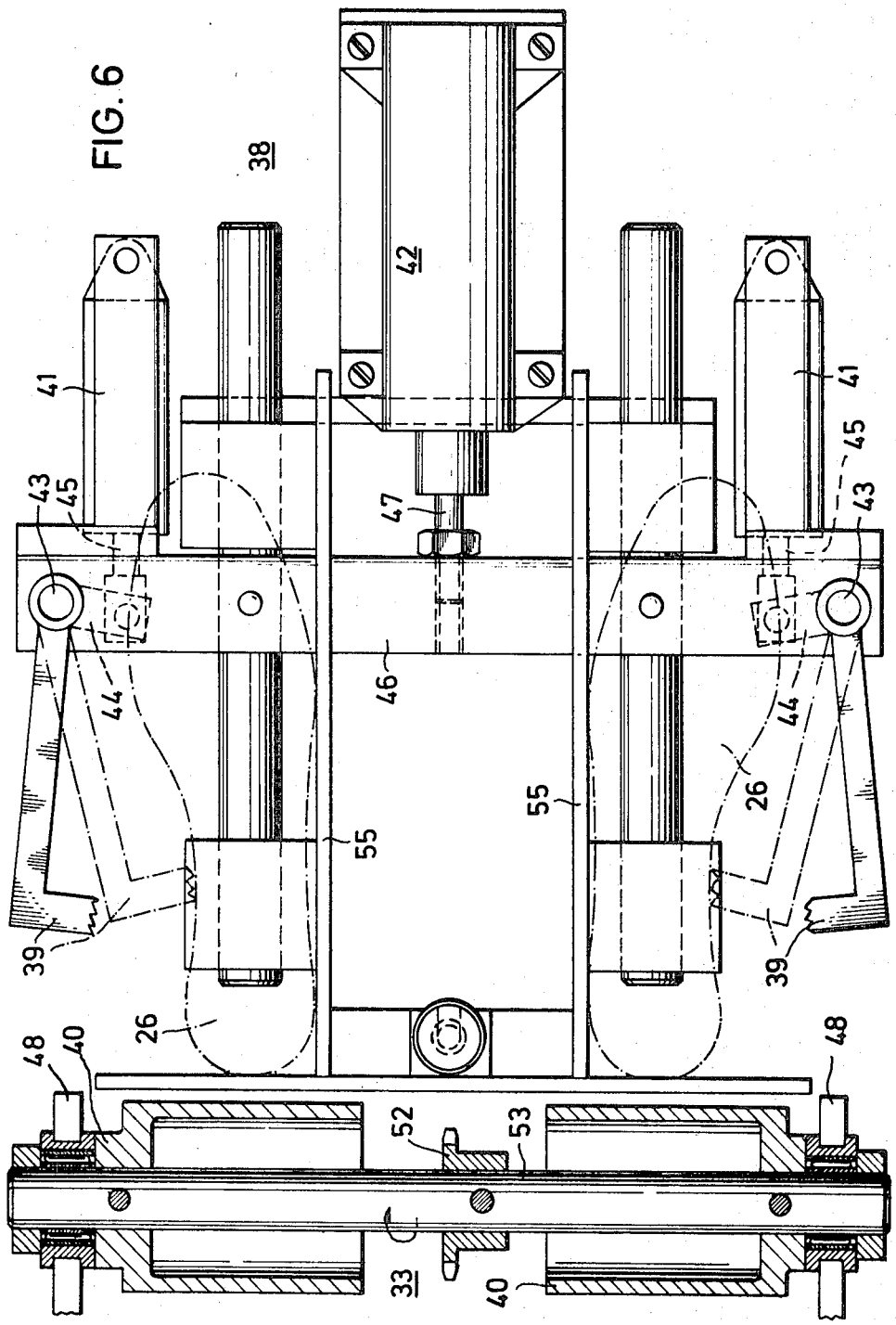

United States Patent Office 3,543,317
Patented Dec. 1, 1970

3,543,317
COMBINED FORMING PRESS AND EJECTING DEVICE
Ernst Mohrbach, Zweibruckerstrasse 6, Rieschweiler, Pfalz, Germany
Filed June 2, 1969, Ser. No. 829,664
Int. Cl. A43d 65/00
U.S. Cl. 12—21                    15 Claims

ABSTRACT OF THE DISCLOSURE

In a device for the forming of planar workpieces, in particular insoles used in the shoe industry, into a curved shape, the cooperating matrix and punch members of a forming press are arranged at a vertical incline angle and the formed workpieces removed from the press by an ejecting lever movable within a slot in said matrix and projectable into the lower part of the matrix cavity. Said lever, operable to a position with its end adjoining the lower portion of the matrix cavity, acts, upon deflection in the upward direction, to engage the lower end of a formed workpiece within said matrix, whereby to eject and feed the same to a chute or the like conveying means.

---

The present invention relates to a press for the forming of planar workpieces, more particularly though not limitatively, for the pressing of the insole cuts as used in the shoe industry into a desired curved or three-dimensional shape. In the fabrication of insoles it is customary to first punch planar cuts from a plate or web of material and to thereafter form the cuts in a press into a shape conforming with a particular last used in conjunction with shoe manufacture.

Forming presses of the foregoing type are known in a variety of constructions for the special field of application mentioned. Their operation is, however, dependent to a large extent on the skill and experience of especially trained operating personnel in feeding the cuts to and removing the formed workpieces from the matrix of a forming press. A manual feeding, pressing and removal of the workpieces has other well-known disadvantages and drawbacks, such as the increased time for carrying out a complete pressing operation, the danger of personal injury, etc.

Accordingly, an important object of the present invention is the provision of a forming press of the referred to type, in particular for the forming or pressing of insole cuts for use in the shoe industry, by which the formed or pressed workpieces are automatically removed or ejected from the press.

A further object of the invention is the provision, in conjunction with a forming press and automatic ejecting device of this type, of means to automatically feed the workpieces to be operated on to the matrix of the press from a supply stack, to enable an integrated fully automatic feeding, forming, and ejecting operation in a relatively simple economical and reliable manner.

The invention, both as to the foregoing and ancillary objects as well as novel aspects thereof, will be better understood from the following detailed description of a preferred practical embodiment taken in conjunction with the accompanying drawings forming part of this disclosure and in which:

FIG. 2 is a partial plan view of FIG. 1, to an enlarged scale, showing the matrices and ejecting mechanisms of a twin-press arrangement for the simultaneous forming of pairs of correlated insole cuts;

FIG. 3 is a longitudinal sectional view of the press unit and ejecting device of FIG. 2, the parts being shown in their position prior to a pressing operation and with the ejecting devices in the zero or starting position;

FIG. 4 is a view similar to FIG. 3, showing the parts in the position upon completion of a pressing operation;

FIG. 5 is still another view similar to FIG. 3, showing the parts in their position immediately prior to the initiation of an ejecting operation; and FIG. 6 is another partial plan view, to an enlarged scale, of FIG. 1, showing more clearly the arrangement for automatically feeding insole cuts from a supply stack to the press.

Like reference numerals denote like parts throughout the different views of the drawings.

Figure 1:
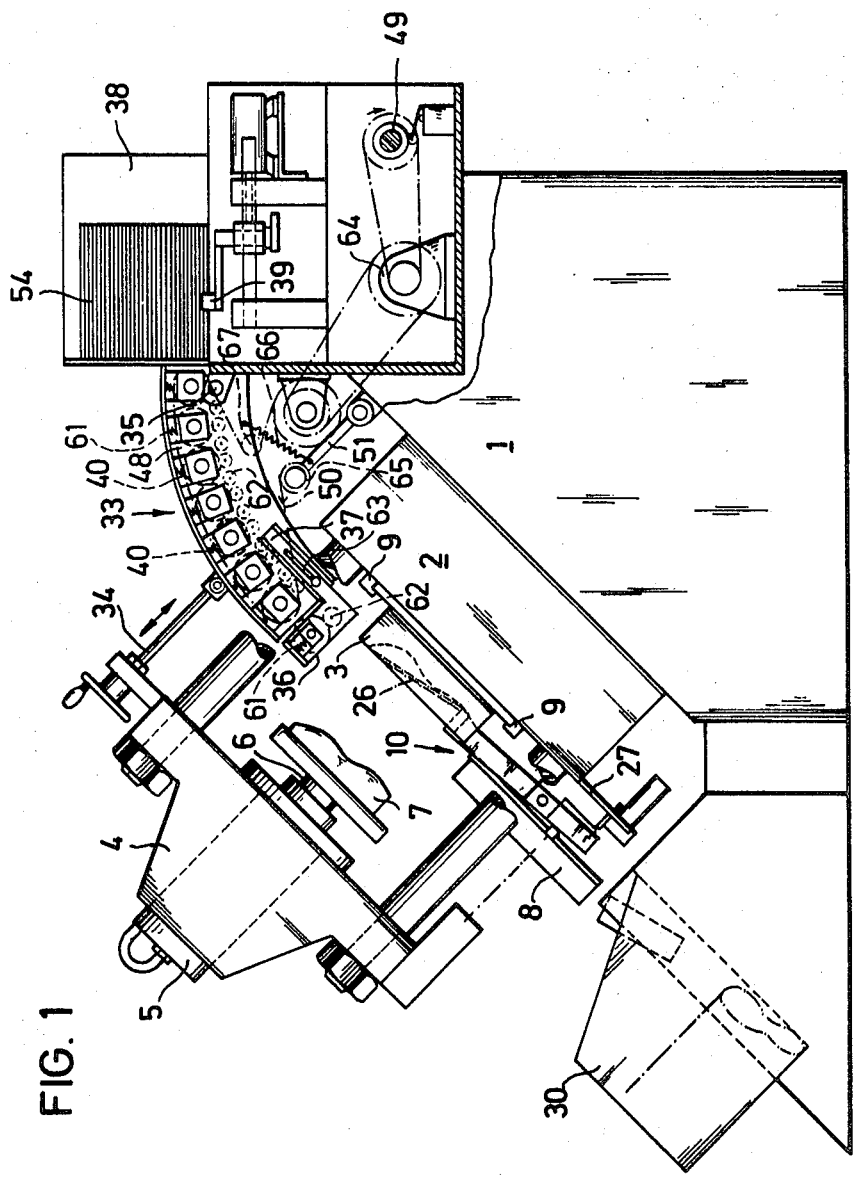
FIG. 1 is an elevational side view of a complete forming press, ejecting device, and feeding conveyor, especially designed for the forming of insole cuts and constructed in accordance with the principles of the invention.

With the foregoing objects in view, the invention involves generally the provision of a forming press of the referred to type comprising essentially a female part or matrix for the reception of the planar cuts to be formed and a cooperating male part or punch, both said matrix and punch being arranged at a predetermined vertical incline angle, and a workpiece ejecting member operable into and out of the matrix cavity and synchronized with the remaining movable parts of the press, to effect an automatic ejection of the pressed cuts or other workpieces.

It is enabled thereby to lift the workpieces in the pressed position in the matrix cavity and to eject and remove the same by said member subsequently to a pressing or forming operation by the effect of gravity, by virtue of the inclined mounting of the main press parts, the ejecting operation being carried out preferably automatically and in synchronism with the pressing operation. No special and complex operations or manipulations are required, therefore, on the part of the operating or supervisory personnel, to remove the processed workpieces. The latter, upon lifting of their lower portions by the ejecting member automatically leave the press matrix by gravity force, provided the mounting at a proper incline angle of the main press parts.

The ejecting member advantageously consists of a double-arm lever having a first lever arm movable within the lower part of the matrix cavity and having a second lever arm deflectable by a hydraulic actuating device or the like. The lever is pivoted upon a horizontally displaceable support operated by a further hydraulic actuator, in such a manner as to enable said lever to be operated to a position to engage the underside of the lower potrion of a pressed workpiece in the matrix cavity, on the one hand, and to deflect said workpiece by lifting and subsequently ejecting the same from said matrix, on the other hand, in a manner as will become further apparent as the description proceeds in reference to the drawings.

In the case of workpieces in the form of insoles, two juxtaposed presses may be provided with the parts of one press arranged as the mirror image of the parts of the other press, for the simultaneous forming of correlated insole cuts for subsequent use in conjunction with a particular shoe size or last.

Disposed in the immediate vicinity of the ejecting device or devices may be a chute or feeding trough arranged at a vertical incline angle conforming to the incline angle of the press, to receive and convey the ejected workpieces to a collecting receptacle, stacking device or a further conveyer for feeding the same to a further processing station. The feeding of the pressed workpieces may be monitored by means of a light beam or the like control device arranged along the path of the workpieces, to effect an automatic stoppage of the press in case of jamming of the workpieces or other operating failures of the press and/or feeding devices.

Aside from the automatic ejection or removal of the pressed workpieces, additional automatic feeding means may be provided to convey the initial workpiece cuts to the press in a continuous integrated operation synchronized with the remaining operations of the device. The additional feeding means advantageously consist of an upwardly vaulted roller conveyer having an input end supported by a stationary pivot and a preferably adjustably mounted output end of a height less than the height of said input end and adjoining the upper edge of the matrix of the press, whereby to enable an alignment of the conveyer with said matrix such as to ensure a safe and reliable transfer of the workpieces from the conveyer to the press.

The workpiece cuts provided in the form of a supply stack may in turn be fed to the input of the roller conveyer by means of a gripping lever or the like arranged for deflection against the edge of the lowermost workpiece of said stack, to firmly grip and align the workpiece being fed against a guide or abutment, on the one hand, and said lever being further arranged for translatory displacement of the gripped workpiece to the input end of the conveyer, both the deflection and displacement of said lever being effected by suitable hydraulic or the like actuators synchronized with the remaining operations of the device, in a manner as will become further apparent from the following description in reference to the drawings.

Referring more particularly to FIG. 1 of the drawings, there is shown a base or frame 1 which may serve to house the hydraulic drive and control devices (not shown) of the press and which carries a support 2 for the matrix or female member 3 of the press unit proper having a cavity conforming to the shape of the planar cuts or workpieces to be shaped or pressed into curved or three dimensional form, such as an insole 26 shown by way of example. The support 2 together with the matrix 3 are disposed at a vertical incline angle, for instance about 45° according to the example illustrated.

Numeral 4 denotes the cross-beam of the press carrying a hydraulic cylinder 5 with its pressure piston having secured thereto the upper member or punch 7 of the press for cooperation with the matrix 3, the entire assembly 4–7 being arranged at the same incline angle as the lower or female press part or matrix 3.

The inclined position of the press has the effect of causing the pressed workpieces (insoles, etc.), upon ejection from the matrix 3 by means of the release and ejecting device to be described presently, to be removed automatically by the action of gravity and with the further aid of a slide or chute 8, in a manner as will become more apparent as the description proceeds.

The matrix 3 may be fixedly mounted upon the support 2 in any suitable manner, such as by means of wedges 9, to enable its easy and ready removal or exchange. The same applies to the mounting of the counter die or punch 7, whereby to enable the press to be used for the pressing of cuts or workpieces of varying configuration and/or size.

In order to remove the pressed workpieces from the matrix after retraction of the punch to its zero or inoperative position shown in FIG. 1, there is provided in accordance with the invention an automatic ejecting device 10 consisting essentially in a double-arm lever, FIGS. 2 and 3, having a first lever arm 11 and a second lever arm 12 and arranged to rotate about a pivot pin 13 which at the same time serves as the support for said lever. Lever arm 11 protrudes, through a slot in the matrix 3, into the lower part of the matrix cavity, while the lever arm 12 being subject to the action of a return spring 15, is arranged to be deflected in a vertical plane and about the pin 13, by the piston of a further hydraulic cylinder or actuating device 16.

Each pivot pin is journalled in a support 17 displaceable in the horizontal direction towards and away from the matrix 3 by means of a further hydraulic control device comprising a cylinder 18 and a piston carrying a piston rod 19 connected, via an intermediate member 19, FIG. 3, to a connecting rod 21 which has its free end secured to the support 17 and is arranged to move within a stationary support or guide 22.

FIGS. 2–6 show a twin-press arrangement comprising a pair of juxtaposed press units, one for each of a pair of correlated insoles 26, arranged mutually as the mirror image one to the other, corresponding like parts or elements of the press units being denoted by like reference numerals in the drawing.

In order to both deflect the ejecting devices about their pivots 13, on the one hand, and to displace the same linearly towards and away from the matrices 3, on the other hand, the effective connection between the pins 13 and the associated hydraulic cylinders consists of a plate 23 secured to the upper end of the piston rod of the vertically disposed hydraulic cylinder 16, said plate being arranged for engagement by rollers 24 mounted upon the free ends of a pair of connecting levers 25 which have their opposite ends secured to the respective pivot pins 13 of the levers 11, 12 of the ejecting devices. As a consequence, the ejecting devices 10 are under the control of both their common hydraulic cylinder 16 and their respective individual cylinders 18 to effect both a rotative and translatory movement or displacement of the levers 11, 12, in the manner pointed out and as will become more apparent from the description of the operation of the device as follows.

Prior to the start of a pressing operation, the lever arms 11 projecting through vertical slots into the cavities of the matrices 3, are in their upper or starting position shown in FIG. 3. An insole 26 or the like planar workpiece is then introduced into the matrices from above, its proper position being determined by the previous adjustment of the ejecting device mounted for this purpose upon a slide plate 27. The latter is in turn displaceably mounted upon the support 2 and fitted with a lateral toothed rack 28 engaged by an adjusting gear 29 operable from the outside of the press.

As can be seen from FIG. 3, the adjustment of the matrices 3 is such as to cause the edge of the levers 11 to act as abutments or positioning means for the lower edge of the insoles or the like workpieces 26 in the inserted position.

After a workpiece has been properly positioned in the matrix 3, FIG. 3, the punch 7 is brought down by the action of the hydraulic cylinder 5 and introduced into the cavity of the respective matrix, to press the workpieces to the desired curved shape, as shown at 26 in FIG. 4. During this operation, the lever arm 11 is deflected, against the action of the return spring 15, downwardly by engagement with the punch 7. FIG. 4 shows the position of the device at the end of a pressing or forming operation.

The lever arm 12 is now slightly raised by the action of the hydraulic cylinder 16, to cause the lever arm 11 to descend and to become released from the punch 7 and the edge of the workpiece 26, whereupon the entire ejecting device is displaced, by the action of the hydraulic cylinder 18, towards and further into the matrix 3, in the manner more clearly shown in FIG. 5. The same operation takes place simultaneously in both press units.

After subsequent retraction of the punch 7 to its zero or inoperative position, reversed operation of the cylinders 16 and 18 causes the lever arm 11, being in a position with its lower end engaging the underside of the workpiece 26, to be deflected upwardly, whereby to eject the workpiece and to effect its automatic removal via the chute 8 by gravity as a result of the inclined mounting of the press or press units, respectively, in the manner shown and described.

There is shown in FIG. 1 near the lower end of the chute 8 a receptacle 30 for the collection of the pressed workpieces. Alternatively, there may be provided in place of the receptacle 30 a stacking device or conveyor, to feed the workpieces to the next operating or processing station.

The ejection of the pressed workpieces 26 from the matrix 3 may be facilitated by the provision of an auxiliary ejecting device 32 mounted in the upper part of the matrix and being subject to the action of a return spring 31 compressed by the punch 7 in its operative position, FIG. 4.

While in the foregoing there has been described only the operation of one of the press units and ejecting devices, it is understood that the identical operation applies to both units shown and being operated in synchronism for the simultaneous forming or pressing of correlated insoles as shown by the example of the drawing.

The feeding of the planar insoles or the like workpieces 26 to the matrix 3 of the press may also be effected automatically, such as by means of a roller conveyor in the manner shown by FIGS. 1 and 6. For this purpose, the conveyor 33, being advantageously of an upwardly vaulted shape, is arranged for adjustment in the vertical direction by means of an adjusting screw 34 engaging its front or discharge end adjacent to the matrix 3, the opposite end 35 of the conveyor being supported by a fixed pivot of constant height. As a consequence, the discharge end of the conveyor may be adjusted in relation to the matrix to compensate for varying work thickness or different positions of the matrix.

The roller conveyor 33 in the example shown consists of a pair of side pieces 48, FIG. 6, upon which are mounted, by means of spindles 53 the driving rollers 40 arranged for cooperation with guide rollers 62 against the action of biasing springs 61.

In order to further facilitate the adjustment, to ensure a safe and reliable transfer of the workpieces to the conveyor, the front roller 36 of the conveyor is supported by a slide 37 displaceably mounted upon the conveyor in the ejecting direction of the workpieces, in the manner shown. Slide 37 is provided to this end with lateral slots 63 engaged by set screws or the like securing means.

The rollers 40 are driven, by way of a gear pair 64 and a chain 50, by a motor 49. Chain 50, being subject to the action of a tensioning device 51 in the form of a reversing gear 65 and return spring 66, engages a number of sprockets 52 mounted centrally upon the spindles 53 which support the rollers for the twin feeding conveyor. The tensioning device is necessary in order to adapt the drive to the varying adjusting positions of the conveyor. In order to further improve this adaptation, an additional guide sprocket 67 may be inserted in the path of the chain.

In the example shown a workpiece 26 is fed automatically to the conveyor 33 from the supply stack 54 disposed within a receptacle 38 by means of a hydraulically operated gripping arm 39 synchronized with the remaining controls of the device, said arm acting to engage the lowermost workpiece of the stack 54 and to feed it to the input roller 40 of the conveyor 33. In FIG. 6, there is shown a twin feeding arrangement for cooperation with a pair of stacks of correlated insoles to be simultaneously processed, in the manner shown and described hereinbefore.

More particularly, the gripping arm 39, FIG. 6, is arranged for rotation by means of a hydraulic cylinder 41, on the one hand, and for translatory movement or displacement towards and away from the input end of the conveyor 33, on the other hand. For this purpose, the arm 39 is rotatable through a pivot pin 43 fitted with an angular extension 44, the latter being jointed to the free end of the piston rod 45 of the cylinders 41. The pins 43 are journalled in the extreme end portions of a cross-beam 46 arranged for displacement parallel to its length and the center of which is connected to the piston rod 47 of the cylinder 42.

As pointed out hereinbefore, the cuts or workpieces, such as in pairs of insoles according to the example illustrated, are fed from a pair of supply stacks 54 disposed in the receptacle 38 of the feeding device. For this purpose, the gripping arms 39, being normally in the rearmost position shown, are at first deflected by the action of the hydraulic cylinders 41 into gripping engagement with the outer edges of the workpieces, as shown in dot-dash lines in FIG. 6, whereby at the same time effecting a proper alignment of the workpieces by a pair of abutments or guide rails or walls 55. This position of the workpieces being in alignment with the matrices 3 is then maintained, whereby to ensure a safe and reliable feeding to the matrices, provided a proper adjustment of the parts in the manner described.

After the gripping arms 39 have engaged a workpiece, they are displaced, via the cross-beam 45 and by the action of the hydraulic cylinder 42, in the direction of the conveyer 33, in such a manner as to cause the input rollers 40 of the conveyer to seize and feed the workpieces to the respective matrices 3. Upon reaching the matrices, the workpieces slide downwardly and into the matrix cavities until engaging the edge of the ejecting lever arm 11, in the manner described hereinbefore. This automatic positioning of the workpieces in the matrices is due to the proper relative adjustment of the parts in the manner described, on the one hand, as well as to the inclined mounting of the press or press units, to involve the effect of gravity in both positioning and ejecting as well as feeding of the workpieces to the next operating or processing station, on the other hand.

After pressing of the workpieces into their final shape, they are automatically ejected and delivered to the receptacle 30 via the chute 8, in the example illustrated and described. An optical or the like control or monitoring device, for instance in the form of a light bar control, may be disposed in the path of the workpieces upon leaving the ejecting device, for monitoring or control, such as for effecting the stoppage of the device in case of failures or interruptions of the operation of the press, to prevent damage or losses.

In the foregoing the invention has been described in reference to an exemplary illustrative device. It will be evident, however, that variations and modifications as well as the substitution of equivalent parts and devices for those shown herein for illustration, may be made without departing from the broader scope and spirit of the invention.

I claim:
1. A press for the forming of planar workpieces, in particular insole cuts for use in the show industry, comprising in combination:
   (1) a matrix having a cavity conforming to the contour of the workpieces to be formed,
   (2) a punch cooperating with said matrix for forming a workpiece inserted therein into a desired curved shape,
   (3) first power means to operate said punch by alternate operating and return strokes respectively into and out of said matrix,
   (4) said matrix and punch being arranged at a predetermined vertical incline angle,
   (5) an ejecting member including biasing means to urge the same to an inoperative position, said member projecting into the lower portion of said matrix cavity, to act as a stop in said inoperative position for the lower edge of a workpiece inserted in said matrix,
   (6) whereby to operate said member by said punch against the action of said biasing means from said inoperative position of engagement with to an intermediate position of disengagement from the lower edge of the workpiece upon said punch assuming the end position of its operating stroke,

(7) second power means to operate said member from said intermediate position towards said cavity to operative position of engagement with the underside of the workpiece in the pressed position, and (8) third power means to operate said member, in cooperation with said second power means and subsequently to a return stroke of said punch, from said operative to said inoperative position, (9) whereby to eject the pressed workpiece by said member from said matrix.

2. A press as claimed in claim 1, including a conveying chute disposed adjacent to the lower end of and having an incline angle substantially conforming to the incline angle of said matrix, to receive the workpieces ejected by said member.

3. A press as claimed in claim 1, said biasing means consisting of a return spring urging said member to its inoperative position.

4. A press as claimed in claim 1, said member consisting of a two-arm lever having a pivot, a linearly displaceable support for said pivot operable by said second power means, said lever having a first lever arm acting as workpiece stop and ejecting means and a second lever arm deflectable by said third power means.

5. A press as claimed in claim 1, said member consisting of a two-arm lever having a pivot, a linearly displaceable support for said pivot operable by said second power means, said lever having a first lever arm acting as workpiece stop and ejecting means and a second lever arm deflectable by said third power means, and said biasing means consisting of a return spring acting on said second lever arm and urging said first lever arm to a raised position of engagement with the edge of a workpiece inserted in said matrix.

6. A press as claimed in claim 1, said first, second, and third power means each consisting of a hydraulic actuating device including a hydraulic cylinder, a piston and piston rod cooperating therewith.

7. A press as claimed in claim 1, including a roller conveyer having an input end and an output end aligned with the upper edge of said matrix for feeding thereto the workpieces to be operated on.

8. A press as claimed in claim 7, said conveyer having an upwardly vaulted shape with its input end disposed at a greater height than its output end and supported by a stationary pivot, and means to adjust the height of the output end of said conveyer.

9. A press as claimed in claim 7, said conveyer having an upwardly vaulted shape with its input end disposed at a greater height than its output end and supported by a stationary pivot, means to adjust the height of the output end of said conveyer, and further means to adjust the extreme feed roller at the output end of said conveyer in the workpiece ejecting direction.

10. A press as claimed in claim 7, said conveyer having an upwardly vaulted shape with its input end disposed at a greater height than its output end and supported by a stationary pivot, means to align the output end of said conveyer with the upper edge of said matrix, and further automatic feeding means adjoining the input end of said conveyer for consecutively feeding thereto workpieces from a supply stack.

11. A press as claimed in claim 7, said conveyer having an upwardly vaulted shape with its input end disposed at a greater height than its output end and supported by a stationary pivot, means to align the output end of said conveyer with the upper edge of said matrix, and automatic feeding means adjoining the input end of said conveyer for consecutively feeding thereto workpieces from a supply stack, said feeding means comprising a gripping arm with associated power means to first deflect said arm into engagement with the lowermost workpiece of said stack against an alignment wall, and to subsequently displace said arm with the gripped workpiece toward the input of said conveyer.

12. A press as claimed in claim 1, including automatic mean synchronized with the operation of the press to continuously feed workpieces from a supply stack to and to remove the processed workpieces from said matrix.

13. In a press as claimed in claim 12, comprising a pair of juxtaposed press and feeding arrangements for simultaneously processing pairs of correlated insole cuts for further use in connection with a given shoe last.

14. A press for the forming of planar workpieces comprising in combination:

(1) a matrix having a cavity conforming to the contour of the workpieces to be formed, (2) a punch cooperating with said matrix for forming a workpiece inserted therein into a desired curved shape, (3) first power means to operate said punch by alternate operating and return strokes respectively into and out of said matrix, (4) said matrix and punch being arranged at a predetermined vertical incline angle, (5) an ejecting member movable within a slot in said matrix and operable from a first position underneath the lower portion of said cavity to a second position of projection into said cavity, and (6) second power means to operate said member from said first to said second position, (7) a conveying chute disposed adjacent to the lower end of said matrix and having an incline angle substantially conforming to the matrix incline angle, (8) whereby to eject a workpiece in the pressed condition from said matrix and to discharge it by gravity into said chute by said member.

15. A press as claimed in claim 14, said member consisting of a two-arm lever having a first lever arm movable within said slot and a second lever arm deflectable by said second power means.

References Cited
UNITED STATES PATENTS 2,306,430  12/1942  Eppler _____ 12—21
2,607,057  8/1952  Alderman _____ 12—21

PATRICK D. LAWSON, Primary Examiner